Sept. 15, 1936.  F. R. ERBACH  2,054,536
REFRIGERATING APPARATUS
Filed July 10, 1933  2 Sheets-Sheet 1
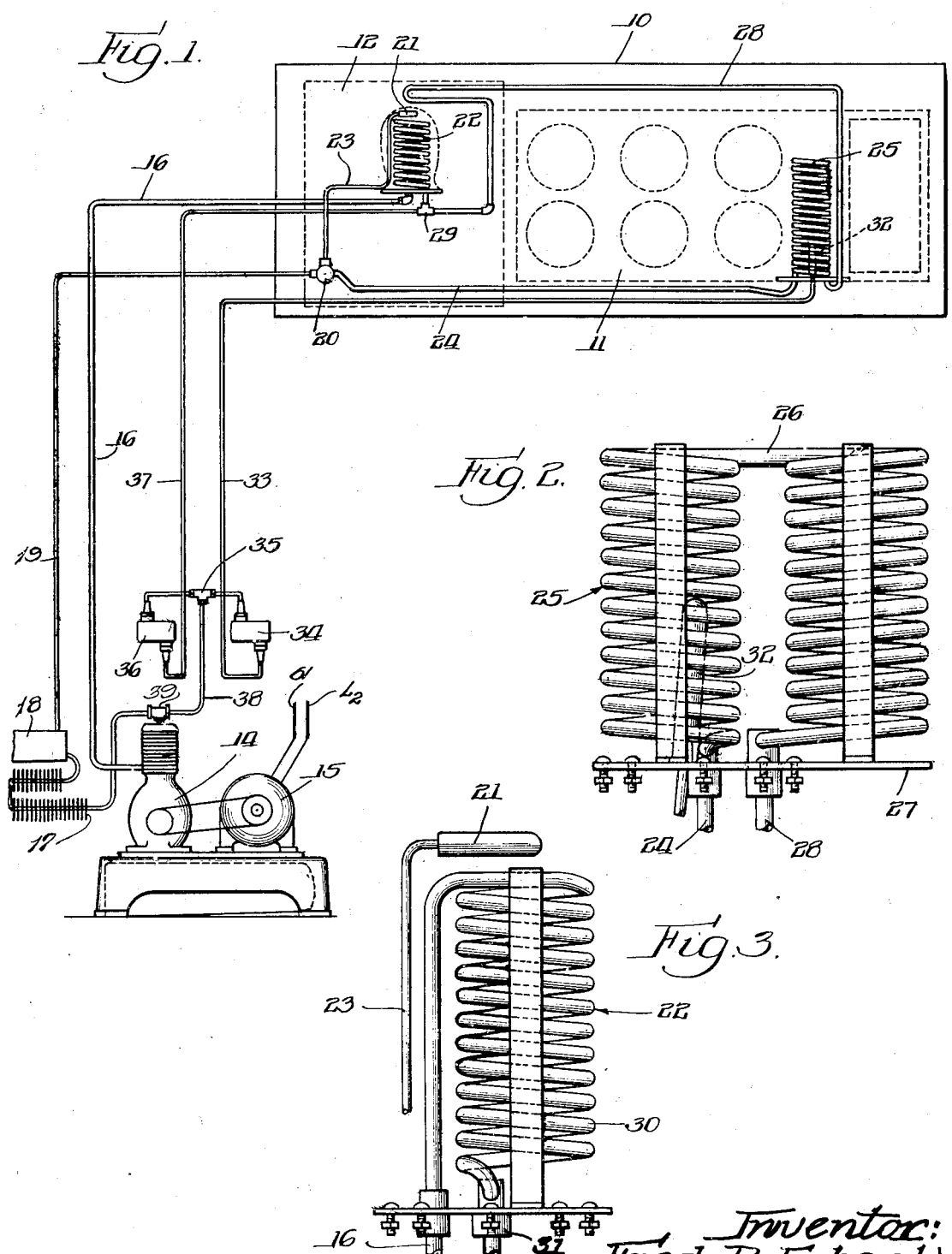
Inventor:
Fred R. Erbach

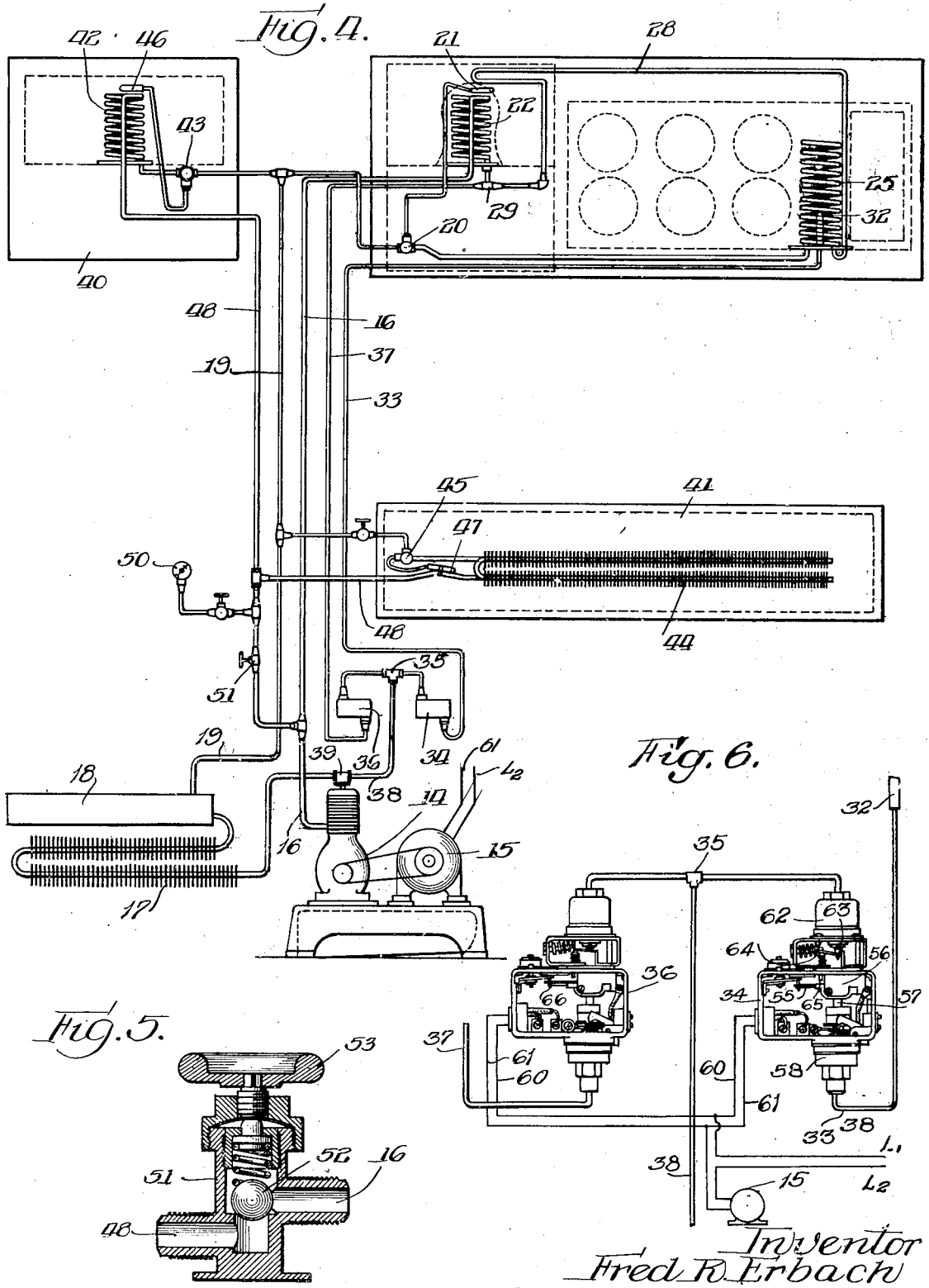

Patented Sept. 15, 1936

2,054,536

UNITED STATES PATENT OFFICE 2,054,536

REFRIGERATING APPARATUS

Fred R. Erbach, Beloit, Wis., assignor to General Refrigeration Corporation, Beloit, Wis., a corporation of Delaware Application July 10, 1933, Serial No. 679,648

9 Claims. (Cl. 62—4)

The invention relates to refrigerating apparatus with more particular reference to temperature control therefor.

One of the objects of the invention is to provide an improved refrigerating system in which various units in the cooling circuit are controlled automatically to maintain the units within different temperature ranges.

More specifically the invention pertains to the refrigeration of soda fountains and contemplates temperature control of the several cooling compartments thereof through novel means operating to supply a refrigerant medium in response to the requirements of the compartments to secure the highest efficiency.

Another object of the invention is to provide for automatic control of the flow of refrigerant medium through the evaporator of the system to meet the demands of the various units, and which includes thermostatic regulation of the compressor motor and expansion valve in combination with a low pressure regulator operating to start and stop the compressor motor upon variations in pressure in the evaporator.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a diagrammatic illustration of a refrigerating system embodying the present invention;

Figure 2 is an elevational view showing one of the cooling units included in the evaporator;

Figure 3 is an elevational view showing another of the cooling units associated with a thermostat bulb;

Figure 4 is a diagrammatic illustration of a refrigerating system similar to Figure 1 but including additional cooling units;

Figure 5 is a detail sectional view showing a form of pressure differential valve, and Figure 6 is a diagrammatic view showing the switches and electrical connections forming the thermostatic and pressure control means.

The refrigerating system of the invention is shown applied to a soda fountain 10 as in Figure 1, which consists of an ice cream compartment 11 formed of a brine tank in which is located a number of containers as shown and a water and soda compartment 12 for maintaining the drinking and soda water at proper temperatures. The refrigerating apparatus comprises a compressor 14 operatively connected with an electric motor 15 for withdrawing the evaporated refrigerant through the suction line 16 and compressing the same, which is then delivered to the condenser 17 and stored in the reservoir 18 having the supply pipe 19 connecting therewith and which leads to expansion valve 20 located within the soda fountain. The expansion valve is of the well known thermostatic type in which the refrigerant supply is controlled by movement of a diaphragm, having one side exposed to a pressure fluid, the pressure of which is responsive to variations in temperature, and its other side exposed to the back pressure of the refrigerant. The variations in pressure are secured by the thermostatic bulb 21 located adjacent the cooling coil 22 and which connects with the thermostatic valve by the capillary tube 23.

The evaporator includes a connection 24 leading from the expansion valve to the cooling coils 25 located within the brine tank and which, as shown in Figure 2, is formed of several sets of coiled tubing 26 suitably secured to support 27 and having an inlet connecting with the tube 24 and an outlet connecting with the tube 28. The tube 28 passes to the rear of the brine tank to maintain this section of the soda fountain, which may be termed the syrup rack, at the desired temperature, finally connecting at 29 with coil 22 in the water compartment. As shown in Figure 3 the tubing 30 forming the coil has an inlet 31 and an outlet connecting with the suction line 16 leading to the compressor.

The bulb thermostat 32 is located within the cooling coils 25 and has connection through the capillary tube 33 with the thermostat 34 joined by the T 35 to the low pressure control 36 having a low pressure control line 37 leading therefrom and connecting at 29 with the evaporator. A high pressure cut-out line 38 provides the third connection for the T and leads to the compressor 14.

As shown in Figure 6, the thermostatic control 34 consists of a switch designated by numeral 55 having one terminal secured and grounded to the control casing, and its other terminal pivotally carried by member 56. The pivoted terminal of the switch is actuated by rod 57 extending within portion 58 of the control casing and being secured to a diaphragm or bellows of usual construction. Portion 58 communicates with tube 33 connecting with the thermostatic bulb 32 and the diaphragm or bellows therein is accordgly subjected to pressure variations of the
ermostatic bulb to in turn move rod 57 and
tuate the pivoted switch terminal. The switch
therefore opens and closes an electric circuit
rmed by conductors 60—61 electrically con-
cted therewith.

The high side of the compressor is connected
T 39, pipe 38 and T 35 to portion 62 of con-
ol 34, said portion having a diaphragm or
llows to which is secured the depending stem 63.
toggle joint indicated at 64 is positioned for
tuation by the vertical movement of stem 63.
ould the pressure on the high side of the com-
essor exceed a predetermined limit, the toggle
nt will be forced into a position on the opposite
ie of the center line, causing downward move-
ent of rod 65 which will engage the pivoted
rminal of the switch. If the switch terminals
e in contact when rod 65 is depressed by the
ggle joint they will be accordingly separated,
sulting in opening of the electric circuit.

A switch 66 of similar construction is located
thin the high and low pressure control 36
d is included in the circuit formed by con-
ctors 60 and 61. Said switch is actuated by
essure variations within the low pressure line 37
d can also be actuated by variations in the
essure within pipe 38 leading from the com-
essor. The mechanism for actuating the
itch terminals is identical in construction with
at described in connection with control 34 and
s operation in a manner similar thereto. The
nnections for the motor 15 complete the circuit,
d motor being connected in series with the
wer lines L₁ and L₂, and in parallel with con-
ctors 60 and 61.

From the foregoing it will be seen that the cool-
g coils 25 in the ice cream compartment of the
la fountain are associated with a bulb thermo-
t operatively connecting with the thermostat
electrically connecting with the motor 15 to
rt and stop the motor and thus the compressor
cording to temperature variations communi-
ed by the bulb 32. It will also be observed
t the cooling coil 22 has association with the
lb thermostat 21 which connects with the ex-
nsion valve to regulate the supply of refrigerant
dium to the evaporator according to the in-
idual requirement of coil 22. The expansion
the liquid refrigerant supplied by receiver 18
ins at the expansion valve 20, producing the
ll known cooling effect in the section 24 of the
porator. As this section freezes the refriger-
 liquid travels farther before evaporating,
ntually evaporating within the cooling coils
continuing on through section 28 and through
merged coil 22 in the water compartment, the
porated refrigerant finally being conducted to
compressor by pipe 16. After a period of
tinuous operation the respective cooling coils
l gradually reduce the temperature of the
ious compartments, with the result that ice
ntually forms around the cooling coil 22 en-
ing the coil and the thermostat bulb 21 in an
formation. Freezing of the bulb 21 has the
ct of reducing the pressure exerted by the
b on the expansion valve 20 to gradually re-
ct the flow of liquid refrigerant to the evapo-
or. In time the flow is restricted to that re-
red for the ice cream compartment, eventually
ering the temperature of the brine to the point
re the thermostat bulb 32 operates thermostat
to stop the motor and thus the compressor.
en this takes place the expansion valve 20
es entirely, cutting off the supply of liquid
refrigerant to the evaporator since the pressure
on supply pipe 19 is reduced when the compressor
stops.

With the compressor stopped it may be assumed
that a demand is made for either cold water or
soda water which will gradually increase the tem-
perature in the water compartment, thawing the
ice formation around the coil 22 and warming
thermostat bulb 21 sufficiently to cause opening
of the expansion valve. The liquid refrigerant
admitted evaporates to increase the back pressure
in the suction line 16 leading to the compressor,
whereupon the low pressure control 36 is actu-
ated to start operation of the compressor. As
the expansion valve 20 is opened liquid refrigerant
is supplied to the evaporator which will feed
through the coils 25 through section 27, finally
evaporating within coil 22 to again cause the
formation of ice around the coil and thermostat
bulb 21. As the expansion valve closes, due to
the freezing of the bulb, the back pressure drops
to cause stopping of the compressor, provided
the ice cream section of the fountain has re-
mained cold within its proper temperature range.
If this is not the case thermostat 34 will have
been actuated so that the motor will not stop until
the circuit thereto is opened by the thermostat.
Assuming that the machine is stopped and a de-
mand is made on the ice cream compartment to
raise the temperature of the brine, it will be
seen that through bulb 32 the thermostat 34 will
feed through the expansion valve and gradually
reduce the temperature of this compartment.

With the present arrangement of control defi-
nite provision is made for maintaining tempera-
tures in an ice cream section of the soda fountain
within certain ranges and temperatures in the
water compartment also within certain ranges
governed by the individual requirements of the
various compartments. As the throttling of the
expansion valve is controlled by the temperatures
in the water compartment, which if maintained
open over an extended length of time would sup-
ply refrigerant to the evaporator to produce an
extremely high back pressure, it is necessary to
have a low pressure cut-out switch in order that
the compressor may be started when the pressure
reaches an upper limit. If the machine does not
start under these circumstances it is possible that
liquid would be supplied through the suction line
16 to the machine, which would result in serious
damage.

In Figure 4 the installation includes the soda
fountain shown in Figure 1 with the addition
thereto of a salad section 40 and back bar sec-
tion 41, the former having a cooling coil 42 sup-
plied with liquid refrigerant from supply line 19
by the thermostatic expansion valve 43, while
the back bar section is provided with a finned
evaporator 44 likewise supplied from line 19 with
liquid refrigerant through the expansion valve
45. Valve 43 is regulated through the thermostat
bulb 46 while valve 45 is operatively connected
with bulb 47. Each evaporator connects with the
suction line 48 provided with the low pressure
gauge 50 and a pressure differential valve 51. The
differential valve is located in the suction line
48 in advance of its connection to line 16 so
that the evaporated refrigerant from the evapo-
rators 42 and 44 is returned to the compressor
when the pressure of the same reaches a prede-
termined upper limit.

Figure 5 shows the manner of control through
the pressure differential valve wherein the inlet
48 and the outlet 16 is normally separated by the spring pressed ball 52, the tension of which may be varied through the setting of handle 53. As the pressure of the fluid in line 48 increases beyond the tension maintaining the ball 52 on its seat the same is lifted to allow escape of the fluid into suction line 16 and thus to the compressor. In the event a demand is made on either cooling coil 42 or 44 their respective expansion valves will automatically operate to admit liquid refrigerant to the coil which in expanding will maintain the desired temperature for the compartment. In time, however, the pressure will build up in the suction line 48 and in line 16. As the low pressure control 36 through line 37 has connection with the evaporator at 29 any increase in the pressure in the suction line 16 will influence the low pressure control and the motor will start when the pressure reaches the upper limit to immediately reduce the back pressure and bring the machine to a stop. It will be seen from the foregoing that cooling of the salad section and back bar section is automatic and independent of each other and of the various compartments of the soda fountain proper. Any demand on the ice cream section or the water compartment of the soda fountain operates to start and stop the compressor independently of the operation of the cooling coils 42 and 44. It will be recalled that the pressure differential valve prevents the withdrawing of the evaporated refrigerant from line 48 even though the compressor is operating so that the normal operation of the expansion valves 43 and 45 is not interfered with when the compressor is operated by the thermostat 34 in response to a demand on the ice cream compartment of the soda fountain.

It is to be understood that I do not wish to be limited by the exact embodiment of the device shown which is merely by way of illustration and not limitation, as various and other forms of the device will of course be apparent to those skilled in the art without departing from the spirit of the invention or the scope of the claims.

I claim:

1. A refrigerating system, comprising a plurality of cooling coils connected in series to form an evaporator, means for circulating a refrigerant medium through the evaporator, an expansion valve between the evaporator and the circulating means, and thermostatic means for regulating the expansion valve, said thermostatic means being associated with the coil farthest removed from the valve.

2. A refrigerating system, comprising a plurality of cooling coils connected in series to form an evaporator, means for circulating a refrigerant medium through the evaporator, an expansion valve between the evaporator and the circulating means, thermostatic means associated with the coil farthest removed from the valve for controlling the valve in accordance with demands of the coil, and a thermostat for controlling the operation of the circulating means in accordance with the demands of another coil.

3. In a refrigerating system, in combination, an evaporator including a number of cooling coils connected in series, an expansion valve, means for circulating a refrigerant through the evaporator including a compressor having its pressure side connecting with the valve and its suction side connecting with the other end of the evaporator, a low pressure switch in the suction line operating to start and stop the compressor upon pressure variations, and thermostatic means regulating the valve and also the compressor, said pressure and thermostatic regulation of the compressor being independent of each other.

4. In a refrigerating system, in combination, an evaporator including a number of cooling coils connected in series, an expansion valve, means for circulating a refrigerant through the evaporator including a compressor having its pressure side connecting with the valve and its suction side connecting with the other end of the evaporator, a low pressure switch in the suction line operating to start and stop the compressor upon pressure variations, thermostatic means regulating the valve responsive to the demands of one coil, and other thermostatic means regulating the compressor in response to demands of another coil.

5. In a refrigerating system, in combination, an evaporator including a number of cooling coils connected in series, an expansion valve, means circulating a refrigerant through the evaporator including a compressor having its pressure side connecting with the valve and its suction side connecting with the other end of the evaporator, thermostatic means regulating the compressor in response to demands of the coil nearest the valve, other thermostatic means regulating the valve responsive to the demands of the coil farthest removed from the valve, and a low pressure switch connecting with the evaporator in the vicinity of said last mentioned coil for starting and stopping the compressor in response to pressure variations in the evaporator.

6. In a refrigerating system, in combination, an evaporator, means for circulating a refrigerant medium through the evaporator, an expansion valve between the evaporator and the circulating means, thermostatic means associated with sections of the evaporator spaced along the length of the evaporator, one thermostatic means controlling the valve and the other controlling the circulating means, and a cooling coil connected in parallel with said evaporator and including an expansion valve delivering refrigerant thereto in accordance with the demands of the same.

7. A refrigerating system, comprising in combination, an evaporator including a number of cooling coils connected in series, means for circulating a refrigerant medium through the evaporator, temperature responsive means associated with one coil for regulating the admission of refrigerant to the evaporator, other temperature responsive means associated with another coil for controlling the operation of the circulating means, and another cooling coil connected in parallel with said evaporator and including an expansion valve delivering a refrigerant thereto in accordance with the demands of the same.

8. A refrigerating system, comprising in combination, an evaporator including a number of cooling coils connected in series, means for circulating a refrigerant medium through the evaporator, temperature responsive means associated with one coil for regulating the admission of refrigerant to the evaporator, other temperature responsive means associated with another coil for controlling the operation of the circulating means, other cooling coils connected in parallel with said evaporator, each coil having its own expansion valve, and thermostatic means for each expansion valve associated with its respective coil.

9. In a refrigerating system, in combination, an evaporator including a number of cooling coils connected in series, an expansion valve, means for circulating a refrigerant through the evaporator including a compressor having its pres-